United States Patent
Mordukhovich et al.

(10) Patent No.: US 12,384,233 B1
(45) Date of Patent: Aug. 12, 2025

(54) DIFFERENTIAL FOR ELECTRIC DRIVE MODULE WITH DUAL COAXIAL MOTORS AND CLUTCH DISCONNECT

(71) Applicant: FCA US LLC, Auburn Hills, MI (US)

(72) Inventors: Gregory Mordukhovich, Auburn Hills, MI (US); Marco Vassallo, Turin (IT)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/819,648

(22) Filed: Aug. 29, 2024

(51) Int. Cl.
| | |
|---|---|
| *B60K 17/16* | (2006.01) |
| *B60K 1/02* | (2006.01) |
| *B60K 17/04* | (2006.01) |
| *F16H 37/08* | (2006.01) |
| *F16H 59/14* | (2006.01) |
| *F16H 59/58* | (2006.01) |
| *F16H 61/28* | (2006.01) |
| *F16H 61/30* | (2006.01) |
| *B60K 7/00* | (2006.01) |
| *B60K 17/348* | (2006.01) |

(52) U.S. Cl.
CPC ............ *B60K 1/02* (2013.01); *B60K 17/043* (2013.01); *B60K 17/165* (2013.01); *F16H 37/0806* (2013.01); *F16H 59/14* (2013.01); *F16H 59/58* (2013.01); *F16H 61/2807* (2013.01); *F16H 61/30* (2013.01); *B60K 7/0007* (2013.01); *B60K 2007/0092* (2013.01); *B60K 17/348* (2013.01)

(58) Field of Classification Search
CPC ...... B60K 1/02; B60K 17/043; B60K 17/165; B60K 7/0007; B60K 17/348; B60K 2007/0092; F16H 37/0806; F16H 59/14; F16H 59/58; F16H 61/2807; F16H 61/30
See application file for complete search history.

(56) References Cited

U.S. PATENT DOCUMENTS

| | | | | |
|---|---|---|---|---|
| 11,780,328 | B2* | 10/2023 | Seemann | B60K 17/046 |
| | | | | 180/65.7 |
| 2023/0311628 | A1* | 10/2023 | Raeder | B60K 1/02 |
| | | | | 475/198 |
| 2024/0109425 | A1* | 4/2024 | Brolles | B60K 17/22 |

FOREIGN PATENT DOCUMENTS

| | | | | | |
|---|---|---|---|---|---|
| CN | 105966223 | A | * | 9/2016 | |
| CN | 106945496 | A | * | 7/2017 | ............... B60K 1/02 |
| CN | 207931390 | U | * | 10/2018 | ........... B60B 35/125 |
| CN | 112277611 | A | * | 1/2021 | |
| CN | 217730192 | U | * | 11/2022 | |
| CN | 115435069 | A | * | 12/2022 | ............... B60K 1/00 |

* cited by examiner

*Primary Examiner* — Justin Holmes
(74) *Attorney, Agent, or Firm* — Jeremy J. Klobucar

(57) ABSTRACT

An electrified powertrain that generates and transfers drive torque to a driveline of an electrified vehicle is provided. The electrified powertrain includes an electric drive module (EDM), and a controller. The EDM includes a first electric motor having a first output drivingly coupled to a first output shaft that drives a first drive wheel; a second electric motor having a second output selectively coupled to a second output shaft; and a clutch. The first output is coupled to the first output shaft through a differential. The second output is coupled to the second output shaft through the differential. The clutch moves between a first position that decouples the second electric motor from the second output shaft; and a second position that couples the second electric motor to the second output shaft.

9 Claims, 5 Drawing Sheets

DIFFERENTIAL FOR ELECTRIC DRIVE MODULE WITH DUAL COAXIAL MOTORS AND CLUTCH DISCONNECT

FIELD

The present application generally relates to electrified vehicles and, more particularly, to a differential for an electric drive module having dual coaxial electric motors, a differential and a clutch for selectively disconnecting at least one of the electric motors based on operating conditions.

BACKGROUND

An electrified vehicle (hybrid electric, plug-in hybrid electric, range-extended electric, battery electric, etc.) includes at least one battery system and at least one electronic drive module having at least one electric motor and associated electric drive gearbox assembly. Typically, the electrified vehicle would include a high voltage battery system and a low voltage (e.g., 12 volt) battery system. In such a configuration, the high voltage battery system is utilized to power at least one electric motor configured on the vehicle and to recharge the low voltage battery system via a direct current to direct current (DC-DC) convertor. The electric drive gearbox assembly can be configured in many ways to achieve various gear ratios for accessing during specific drive conditions. In some dual motor examples however it can be inefficient operating both motors concurrently providing more power and torque than is needed. Accordingly, while such electronic drive modules do work well for their intended purpose, there is a desire for improvement in the relevant art.

SUMMARY

According to one example aspect of the invention, an electrified powertrain that generates and transfers drive torque to a driveline of an electrified vehicle is provided. The electrified powertrain includes an electric drive module (EDM), and a controller. The EDM includes a first electric motor having a first output coupled to a first output shaft that drives a first drive wheel; a second electric motor having a second output selectively coupled to a second output shaft; and a clutch. The first output is coupled to the first output shaft through a differential. The second output is coupled to the second output shaft through the differential. The clutch moves between a first position that decouples the second electric motor from the second output shaft, wherein in the first position drive torque is provided to the first and second drive wheels exclusively from the first electric motor; and a second position that couples the second electric motor to the second output shaft, wherein in the second position the first and second electric motors drive the first and second drive wheel through the differential. The controller controls operation of the clutch based on operating conditions.

In some implementations, the electrified powertrain includes a first reducer disposed between the first output shaft and the first drive wheel; and a second reducer disposed between the second output shaft and the second drive wheel.

In some implementations, at least one of the first and second electric motors are induction motors.

In some implementations, at least one of the first and second electric motors are permanent magnet motors.

In some implementations, the clutch is a dog clutch.

In additional aspects, the clutch is a one of a multi-plate electromagnetic and hydro-electric magnetic clutch.

In additional features, the clutch collectively comprises a first multi-plate clutch; and a second controllable one way clutch (COWC). In the first position the first clutch is closed and the second clutch is free rolling. In the second position, the first clutch is open and the second clutch is locked.

In examples, the first and second electric motors are coaxially arranged.

In additional features, the controller is configured to command the clutch to operate in the first position based on low torque operating conditions.

In other features, the controller is configured to command the clutch to operate in the second position based on high torque request operating conditions.

In additional aspects, the controller is configured to command the clutch to operate in the second position based on turning torque request operating conditions.

In other features, the electric drive module is operable in a first drive mode wherein only the first electric motor provides drive torque and in a second drive mode wherein both of the first and second electric motors provide drive torque.

According to another example aspect of the invention, an electrified powertrain that generates and transfers drive torque to a driveline of an electrified vehicle is provided. The electrified powertrain includes an electric drive module (EDM) including a first electric motor having a first output drivingly coupled to a first output shaft that drives a first drive wheel; and a second electric motor having a second output selectively coupled to a second output shaft that drives a second drive wheel. The first output is coupled to the first output shaft through a differential. The second output is coupled to the second output shaft through the differential.

In examples, the first and second electric motors are coaxially arranged.

In other features, the electric drive module is operable in a first drive mode wherein only the first electric motor provides drive torque and in a second drive mode wherein both of the first and second electric motors provide drive torque.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As discussed above, in some EDM's having dual motors, it can be inefficient operating both motors concurrently providing more power and torque than is needed. In particular, in some prior art dual motor configurations, both motors provide all power and torque during full driving cycles and are on all the time regardless of the required power and torque. For example, during high speed highway driving where only low torque is necessary, operating both electric motors is inefficient.

The instant disclosure provides an EDM that incorporates two coaxial electric motors, a differential and in some examples, one or more clutches. The EDM is configured to operate in two modes for optimal efficiency. In a first configuration, a clutch selectively couples a first electric motor to first and second output shafts through a differential in a first highway drive mode. In a second drive mode, the clutch selectively couples both a first and second electric motor to first and second outputs shafts through a differential in a second launch or maximum power mode. In a second configuration, a first electric motor drives a first output shaft through a differential and a second electric motor drives a second output shaft through the differential. In a first highway drive mode only the first electric motor provides a torque input. In a second launch or maximum power mode, both of the electric motors provide a torque input. In a third configuration, a first and a second clutch connect a differential to a second electric motor. A first electric motor drives a first output shaft through a differential. A second electric motor drives a second output shaft through the differential depending on a state of the first and second clutches. The disclosed configurations all increase efficiency of the EDM requiring reduced time when both the electric motors need to be on such as during turning. Further, decreased battery weight and cost is required. Distances between recharging are further increased.

Figure 1:
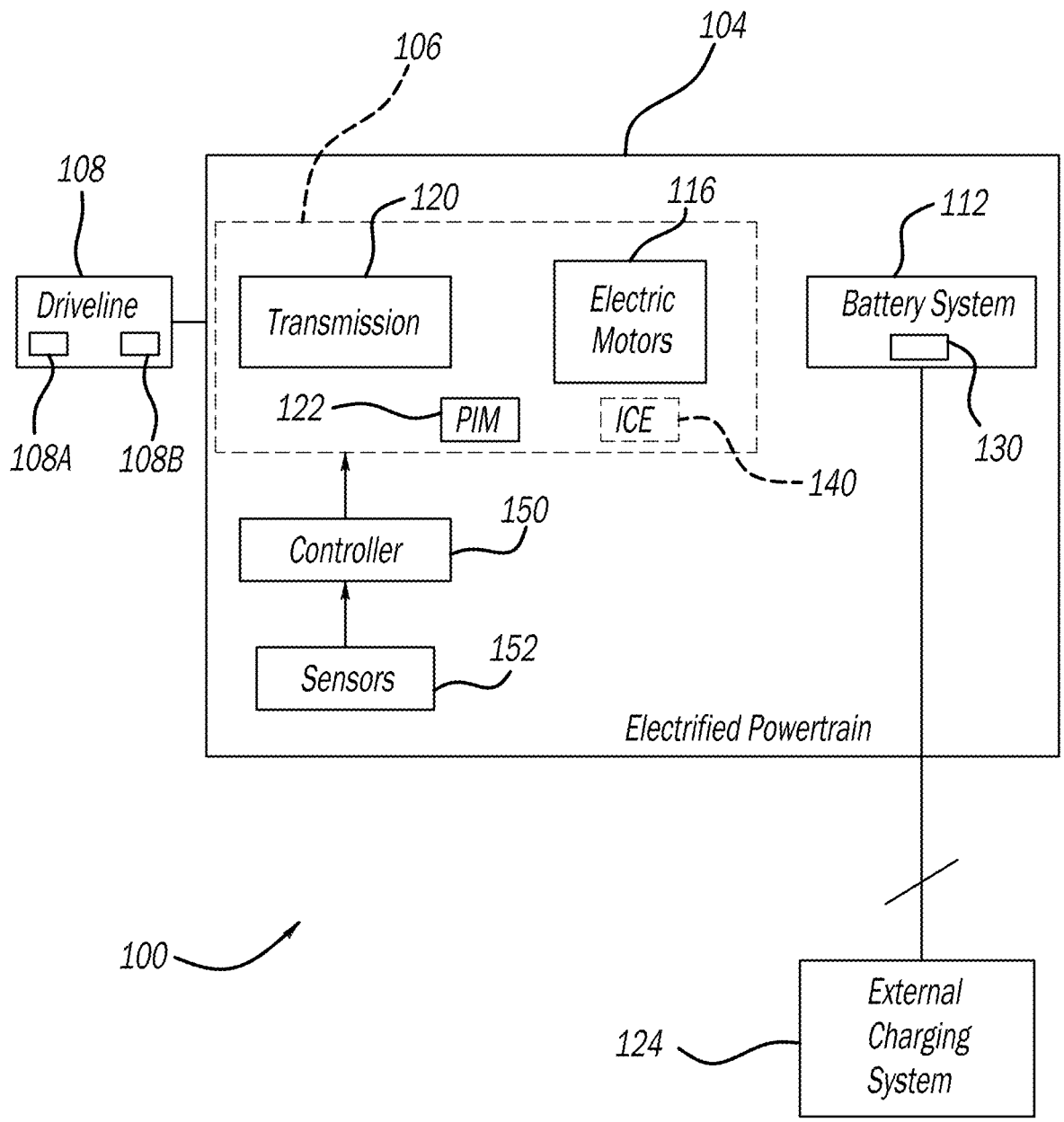
FIG. 1 is a functional block diagram of an electrified vehicle having an electronic drive module (EDM) according to various principles of the present application.

Referring now to FIG. 1, a functional block diagram of an example electrified vehicle 100 (also referred to herein as "vehicle 100") according to the principles of the present application is illustrated. The vehicle 100 includes an electrified powertrain 104 having an electric drive module (EDM) 106 configured to generate and transfer drive torque to a driveline 108 for vehicle propulsion. The EDM 106 generally includes two electric motors, collectively identified at 116 (e.g., electric traction motors), an electric drive gearbox assembly or transmission, collectively identified at 120, and power electronics including a power inverter module (PIM) 122.

The electric motors 116 are selectively connectable via the PIM 124 to a high voltage battery system 112 for powering the electric motors 116. The battery system 112 is selectively connectable (e.g., by the driver) to an external charging system 124 (also referred to herein as "charger 124") for charging of the battery system 112. The battery system 112 includes at least one battery pack assembly 130. In some examples, described herein, the electrified powertrain 104 can be a hybrid powertrain that additionally includes an internal combustion engine 140. A controller 150 can provide various inputs to the EDM 106, based on signals received from sensors 152 to operate the EDM in various modes based on operating conditions as described herein.

With additional reference now to FIGS. 2A and 2B, an EDM 106 constructed in accordance to a first example of the present disclosure will be described. The EDM 106 includes a first electric motor 116A, a second electric motor 116B, a differential 160 and a clutch 170. The differential 160 can include planet gears 162A, 162B rotatably coupled to a carrier 164. The planet gears 162A, 162B are meshed for rotation with output gears 164A, 164B. In the example shown the planet gear 162A drives the output shaft 180A while the planet gear 162B drives the output shaft 180B.

The clutch 170 can be a dog clutch or other clutch configuration. As will become appreciated, the dog clutch 170 operates with two on positions of engagement. The first and second electric motors 116A and 116B selectively communicate drive torque to reducers 120A and 120B that are respectively coupled to the driveline 108 for driving first and second drive axles/wheels 108A, 108B. The EDM 106 includes a first output shaft 180A drivingly coupled to a first output 172A of the first electric motor 116A and a second output shaft 180B selectively coupled to a second output 172B of the second electric motor 116B. The clutch 170 further selectively connects the first and second output shafts 180A, 180B through the differential 160.

Figures 2A, 2B:
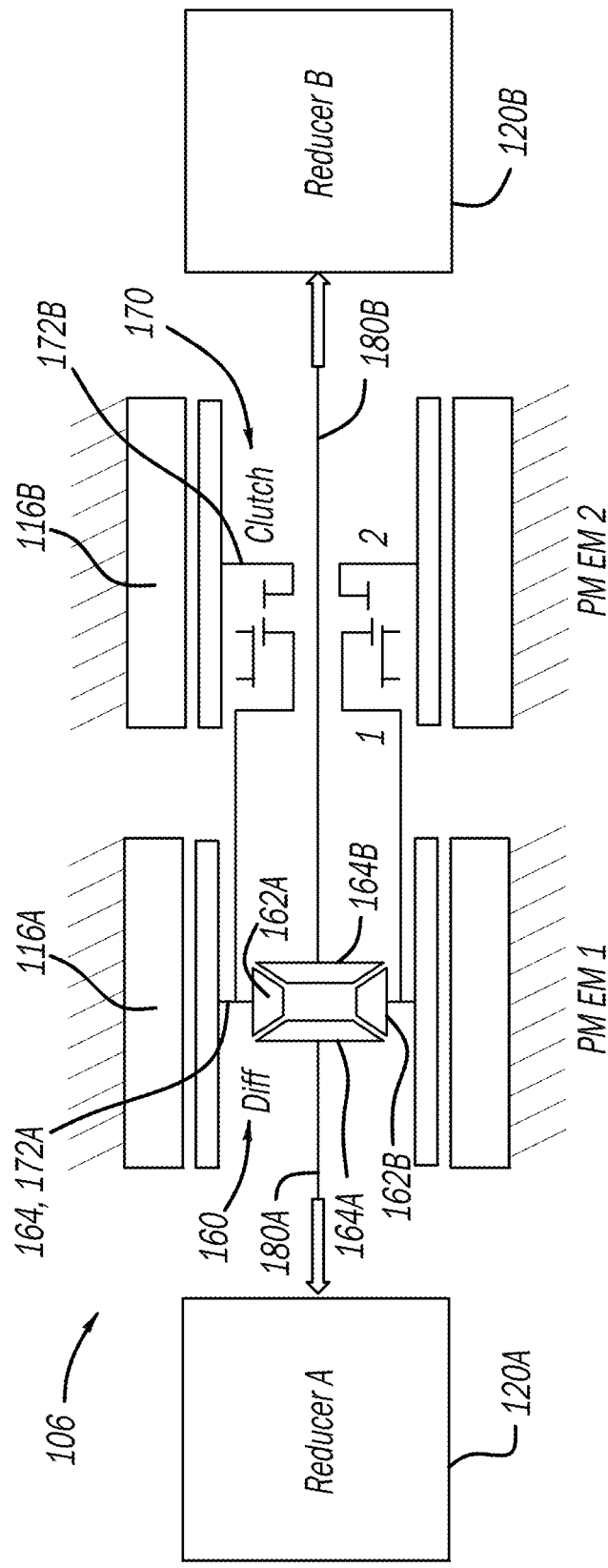
FIG. 2A is schematic illustration of an EDM having a differential and a clutch configuration according to a first example of the present application, the clutch shown in a first position.
FIG. 2B is a table illustrating various operating modes used by the EDM of FIG. 2A according to various principles of the present application.

As shown in the Table 190 of FIG. 2B, the EDM 106 can be operated in various modes by actuating the clutch 170 between a first position and a second position. In examples, the clutch 170 can be commanded to actuate based on a signal from the controller 150. In the first position (FIG. 2A), the clutch 170 decouples the second electric motor 116B from the second output shaft 180B and couples the first and second output shafts 180A and 180B to each other through the differential 160. In this first position, the first electric motor 116A exclusively provides torque input through the differential 160 and through the reducers 120A, 120B to the driveline 108.

Figures 3A, 3B:
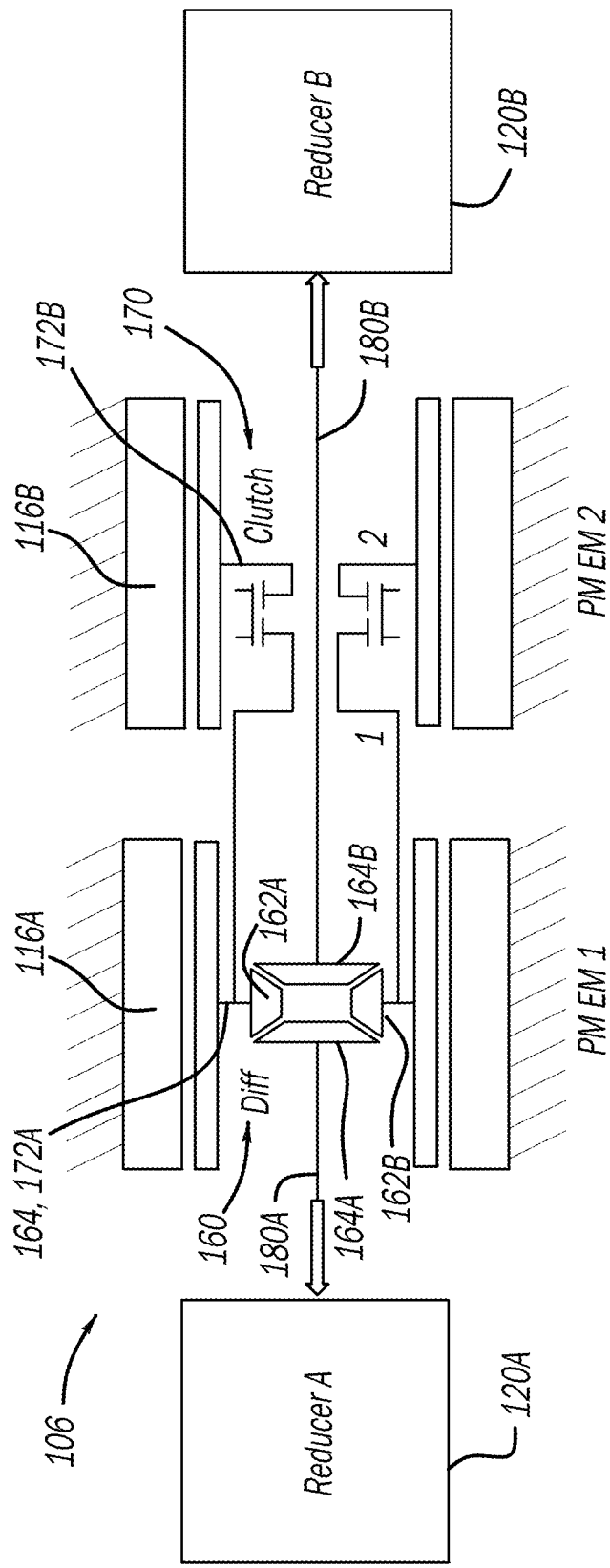
FIG. 3A is schematic illustration of the EDM of FIG. 2 and shown with the clutch in a second position according to the present application.
FIG. 3B is a table illustrating various operating modes used by the EDM of FIG. 3A according to various principles of the present application.

As identified above, the first position can be used when full torque is not necessary, such as, but not limited to highway driving. In this first position, only the first electric motor 116A is on. The second electric motor 116B can be turned off saving power and running the EDM 106 more efficiently. In the second position (FIG. 3A), the clutch 170 couples the second electric motor 116B to the first output 172A. The controller 150 activates the clutch 170 when speed synchronization between the first and second electric motors 116A, 116B is acceptable (e.g., based on inputs from sensors 152 such as wheel speeds and other inputs) for noise vibration and harshness (NVH). In other examples, an additional disconnect clutch can be added to the first electric motor 116A or reducer 120A for sailing and towing capabilities if a permanent magnet (PM) is used for the first electric motor 116A. In other examples, a lock-up and/or limited slip clutch can be added based on vehicle application. Operation of the electric motor 116B is not necessary for turning.

In the second position (FIG. 3A), the first and second electric motors 116A, 116B drive the first output shaft 180A, and the second output shaft 180B through the differential 160. In this regard, the output gear 164A drives the first output shaft 180A, the first reducer 120A and the first drive axle/wheel 108A. Similarly, the output gear 164B drives the second output shaft 180B, the second reducer 120B and the second drive axle/wheel 108B. In the second position, both the first and second electric motors 116A, 116B provide torque input through the differential to the first and second output shafts 180A, 180B.

Figures 4A, 4B:
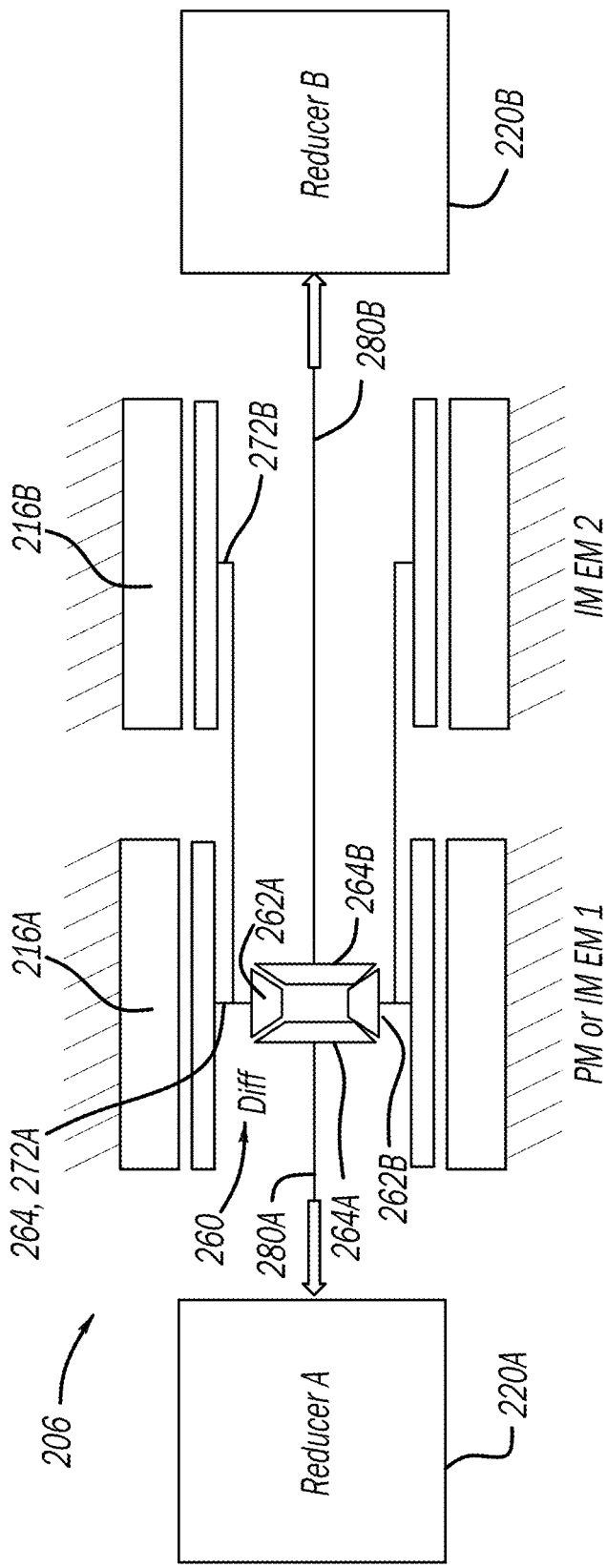
FIG. 4A is schematic illustration of an EDM having a differential configuration according to a second example of the present application.
FIG. 4B is a table illustrating various operating modes used by the EDM of FIG. 4A according to various principles of the present application.

With additional reference now to FIGS. 4A and 4B, an EDM 206 constructed in accordance to a second example of the present disclosure will be described. The EDM 206 includes a first electric motor 216A, a second electric motor 216B and a differential 260. The differential 260 can include planet gears 262A, 262B rotatably coupled to a carrier 264. The planet gears 262A, 262B are meshed for rotation with output gears 264A, 264B. In the example shown the planet gear 262A drives the output shaft 280A while the planet gear 262B drives the output shaft 280B.

The first and second electric motors 216A and 216B selectively communicate drive torque to reducers 220A and 220B that are respectively coupled to the driveline 208 for driving first and second drive axles/wheels (see reference 108A, 108B, FIG. 1). The EDM 206 includes a first output shaft 280A drivingly coupled, through the differential 260, to a first output 272A of the first electric motor 216A and a second output shaft 280B drivingly coupled, through the differential 260, to a second output 272B of the second electric motor 216B.

In advantages, only the first electric motor 216A is on during highway cycle. In a launch or maximum power mode, both of the first and second electric motors 216A, 216B provide a torque input. In other examples, an additional disconnect clutch can be added to the first electric motor 216A or reducer 220A for sailing and towing capabilities if a permanent magnet (PM) is used for the first electric motor 216A. In other examples, a lock-up and/or limited slip clutch can be added based on vehicle application. Operation of the electric motor 216B is not necessary for turning.

With additional reference now to FIGS. 5A and 5B, an EDM 306 constructed in accordance to a third example of the present disclosure will be described. The EDM 306 includes a first electric motor 316A, a second electric motor 316B, a differential 360, a first clutch 370A and a second clutch 370B. The first clutch 370A can be a multi-plate electromagnetic or hydro-electric magnetic clutch or other clutch configuration. The second clutch 370B can be a controllable one way clutch (COWC) or other configuration.

The first and second electric motors 316A and 316B selectively communicate drive torque to reducers 320A and 320B that are respectively coupled to the driveline for driving first and second drive axles (see axles 108A, 108B). The EDM 306 includes a first output shaft 380A drivingly coupled to a first output 372A of the first electric motor 416A through the differential 360. The EDM further includes a second output shaft 480B selectively coupled to a second output 372B of the second electric motor 316B through the differential 360 based on a status of clutches 370A, 370B. The clutches 370A, 370B cooperate to further selectively connect the second electric motor 316B to the second output 372B.

Figures 5A, 5B:
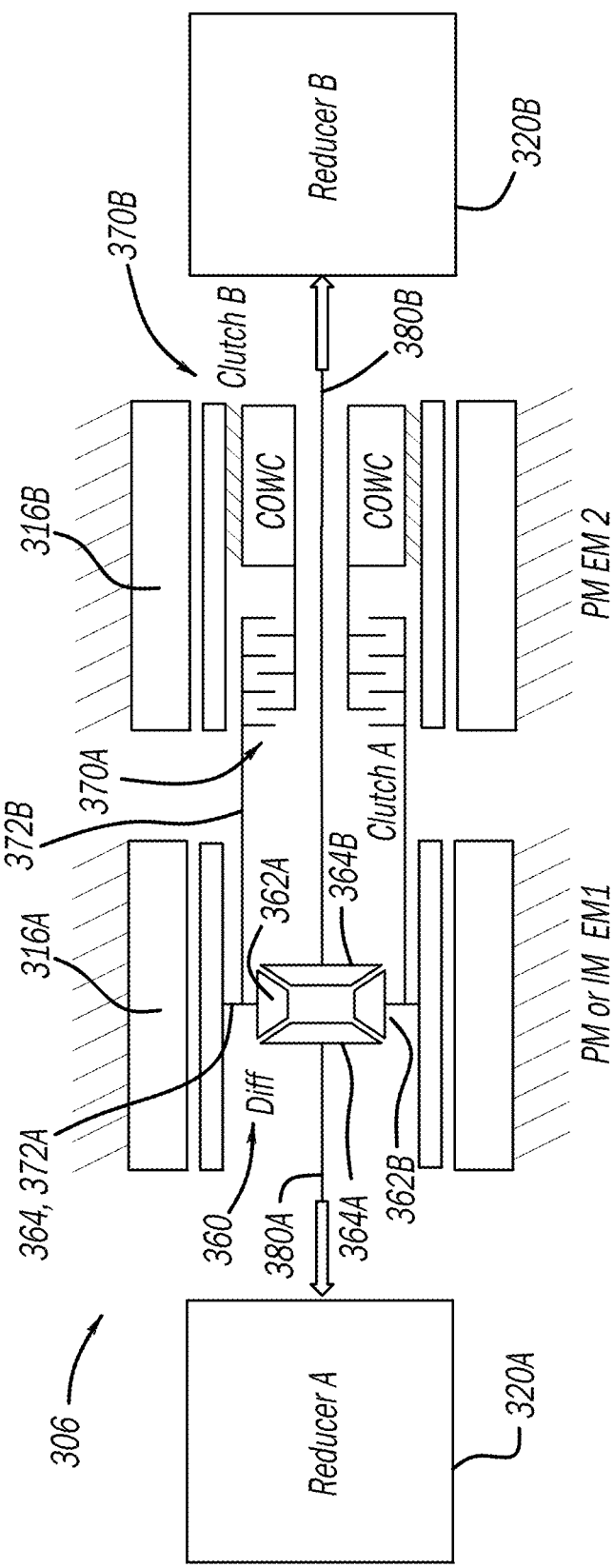
FIG. 5A is schematic illustration of an EDM having a differential, a wet clutch and a one way clutch configuration according to a third example of the present application.
FIG. 5B is a table illustrating various operating modes used by the EDM of FIG. 5A according to various principles of the present application.

As shown in the Table 390 of FIG. 5B, the EDM 306 can be operated in various modes by actuating the clutches 370A, 370B between a first position and a second position. In examples, the clutches 370A, 370B can be commanded to actuate based on a signal from the controller 150. In a first driving condition suitable for highway cycle, clutch 370A is open and clutch 370B is free rolling. During highway cycle, the first electric motor 316A provides a torque input.

As identified above, the first position can be used when full torque is not necessary, such as, but not limited to highway driving. In this first position, the second electric motor 316B can be turned off saving power and running the EDM 306 more efficiently. The second driving condition is suitable for launch or maximum power situations. In the second driving condition, the clutch 370A is closed and the clutch 270B is locked. During launch or maximum power situations, both of the first and second electric motors 316A, 316B provide a torque input. In other examples, an additional disconnect clutch can be added to the first electric motor 316A or reducer 320A for sailing and towing capabilities if a permanent magnet (PM) is used for the first electric motor 316A. In other examples, a lock-up and/or limited slip clutch can be added based on vehicle application. Operation of the electric motor 316B is not necessary for turning.

As used herein, the term controller or module refers to an application specific integrated circuit (ASIC), an electronic circuit, a processor (shared, dedicated, or group) and memory that executes one or more software or firmware programs, a combinational logic circuit, and/or other suitable components that provide the described functionality.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. An electrified powertrain that generates and transfers drive torque to a driveline of an electrified vehicle, the electrified powertrain comprising:
   an electric drive module comprising:
   a first electric motor having a first output coupled to a first output shaft that drives a first drive wheel, the first output coupled to the first output shaft through a differential;
   a second electric motor having a second output selectively coupled to a second output shaft, the second output coupled to the second output shaft through the differential; and
   a clutch having a first multi-plate clutch and a second controllable one way clutch (COWC), wherein the clutch moves between:
   a first position that decouples the second electric motor from the second output shaft, wherein in the first position drive torque is provided to the first and second drive wheels exclusively from the first electric motor, wherein in the first position the first clutch is closed and the second clutch is free rolling; and a second position that couples the second electric motor to the second output shaft, wherein in the second position the first and second electric motors drive the first and second drive wheel through the differential, wherein in the second position the first clutch is open and the second clutch is locked; and a controller that controls operation of the clutch based on operating conditions.

2. The electrified powertrain of claim 1, further comprising:

a first reducer disposed between the first output shaft and the first drive wheel; and a second reducer disposed between the second output shaft and the second drive wheel.

3. The electrified powertrain of claim 1, wherein at least one of the first and second electric motors are induction motors.

4. The electrified powertrain of claim 1, wherein at least one of the first and second electric motors are permanent magnet motors.

5. The electrified powertrain of claim 1, wherein the first and second electric motors are coaxially arranged.

6. The electrified powertrain of claim 1, wherein the controller is configured to command the clutch to operate in the first position based on first torque operating conditions.

7. The electrified powertrain of claim 6, wherein the controller is configured to command the clutch to operate in the second position based on second torque request operating conditions.

8. The electrified powertrain of claim 1, wherein the controller is configured to command the clutch to operate in the second position based on turning torque request operating conditions.

9. The electrified powertrain of claim 1, wherein the electric drive module is operable in a first drive mode wherein only the first electric motor provides drive torque and in a second drive mode wherein both of the first and second electric motors provide drive torque.

* * * * *